(12) United States Patent
Rogers et al.

(10) Patent No.: US 8,382,981 B2
(45) Date of Patent: Feb. 26, 2013

(54) FRAME SYSTEM FOR MEMBRANE FILTRATION MODULES

(75) Inventors: Peter Rogers, Belper (GB); Stephen Bowmer, West Hallam (GB); Bruce Gregory Biltoft, Chatswood (AU); James W. Polson, Terrey Hills (AU); Robert James McMahon, Leichhardt (AU); Huw Alexander Lazaredes, Woolloomooloo (AU); Michael Collignon, Annangrove (AU)

(73) Assignee: Siemens Industry, Inc., Alpharetta, GA (US)

( * ) Notice: Subject to any disclaimer, the term of this patent is extended or adjusted under 35 U.S.C. 154(b) by 38 days.

(21) Appl. No.: 13/055,284

(22) PCT Filed: Jul. 29, 2009

(86) PCT No.: PCT/AU2009/000965
§ 371 (c)(1),
(2), (4) Date: Jan. 21, 2011

(87) PCT Pub. No.: WO2010/009518
PCT Pub. Date: Jan. 28, 2010

(65) Prior Publication Data
US 2011/0127209 A1    Jun. 2, 2011

(30) Foreign Application Priority Data

Jul. 24, 2008   (AU) ................................. 2008903797

(51) Int. Cl.
*B01D 63/06* (2006.01)
*B01D 63/00* (2006.01)
*B01D 69/10* (2006.01)

(52) U.S. Cl. ..................... 210/323.1; 210/232; 210/240; 210/321.6; 210/322; 210/323.2; 210/340; 210/346; 29/469

(58) Field of Classification Search .................. 210/232, 210/240, 322, 323.1, 323.2, 321.6, 340, 346; 29/469
See application file for complete search history.

(56) References Cited

U.S. PATENT DOCUMENTS

| 256,008 A | 4/1882 | Leak |
|---|---|---|
| 511,995 A | 1/1894 | Buckley |

(Continued)

FOREIGN PATENT DOCUMENTS

| AU | 34400/84 A | 4/1985 |
|---|---|---|
| AU | 55847/86 A | 9/1986 |

(Continued)

OTHER PUBLICATIONS

"Chemical Cleaning Definition", Lenntech BV, Lenntech Water treatment & purification Holding B.V., Chemical Cleaning.

(Continued)

*Primary Examiner* — John Kim

(57) ABSTRACT

A module arrangement (5) according to an embodiment of the invention consists of a plurality of membrane modules (6) arranged in a two dimensional array (7) and extending between upper and lower block-type manifolds (8) and (9), respectively. The array of modules is further divided into sub-groups of modules (10) separated from each other by space (11) extending transversely across the membrane array (7). An integrated support frame (12) is positioned in the space (11) between the sub-groups (10) and is fixed to the upper and lower manifold blocks (8) and (9) to form an integrated support structure within the module array (7).

12 Claims, 9 Drawing Sheets

U.S. PATENT DOCUMENTS

| | | |
|---|---|---|
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Jacob Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |

| Patent No. | Date | Inventor(s) |
|---|---|---|
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |

| | | | |
|---|---|---|---|
| 6,042,677 A | 3/2000 | Mahendran et al. | |
| 6,045,698 A | 4/2000 | Cote et al. | |
| 6,045,899 A | 4/2000 | Wang et al. | |
| 6,048,454 A | 4/2000 | Jenkins | |
| 6,048,455 A | 4/2000 | Janik | |
| 6,066,401 A | 5/2000 | Stilburn | |
| 6,071,404 A | 6/2000 | Tsui | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A | 12/2000 | Zha et al. | |
| 6,159,373 A | 12/2000 | Beck et al. | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 | 4/2001 | Baurmeister et al. | |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 | 8/2001 | Miyashita et al. | |
| 6,284,135 B1 | 9/2001 | Ookata | |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 | 10/2001 | Cote et al. | |
| 6,315,895 B1 | 11/2001 | Summerton et al. | |
| 6,319,411 B1 | 11/2001 | Cote | |
| 6,322,703 B1 | 11/2001 | Taniguchi et al. | |
| 6,324,898 B1 | 12/2001 | Cote et al. | |
| 6,325,928 B1 * | 12/2001 | Pedersen et al. | 210/232 |
| 6,325,938 B1 | 12/2001 | Miyashita et al. | |
| 6,331,248 B1 | 12/2001 | Taniguchi et al. | |
| 6,337,018 B1 | 1/2002 | Mickols | |
| RE37,549 E | 2/2002 | Mahendran et al. | |
| 6,349,835 B1 | 2/2002 | Saux et al. | |
| 6,354,444 B1 | 3/2002 | Mahendran et al. | |
| 6,361,695 B1 | 3/2002 | Husain et al. | |
| 6,368,819 B1 | 4/2002 | Gaddy et al. | |
| 6,372,138 B1 | 4/2002 | Cho et al. | |
| 6,375,848 B1 | 4/2002 | Cote et al. | |
| 6,383,369 B2 | 5/2002 | Elston | |
| 6,387,189 B1 | 5/2002 | Groschl et al. | |
| 6,402,955 B2 | 6/2002 | Ookata | |
| 6,406,629 B1 | 6/2002 | Husain et al. | |
| 6,423,214 B1 | 7/2002 | Lindbo | |
| 6,423,784 B1 | 7/2002 | Hamrock et al. | |
| 6,432,310 B1 | 8/2002 | Andou et al. | |
| 6,440,303 B2 | 8/2002 | Spriegel | |
| D462,699 S | 9/2002 | Johnson et al. | |
| 6,444,124 B1 | 9/2002 | Onyeche et al. | |
| 6,468,430 B1 | 10/2002 | Kimura et al. | |
| 6,471,869 B1 | 10/2002 | Yanou et al. | |
| 6,485,645 B1 | 11/2002 | Husain et al. | |
| 6,495,041 B2 | 12/2002 | Taniguchi et al. | |
| 6,517,723 B1 | 2/2003 | Daigger et al. | |
| 6,524,481 B2 | 2/2003 | Zha et al. | |
| 6,524,733 B1 | 2/2003 | Nonobe | |
| 6,550,747 B2 | 4/2003 | Rabie et al. | |
| 6,555,005 B1 | 4/2003 | Zha et al. | |
| 6,562,237 B1 | 5/2003 | Olaopa | |
| 6,576,136 B1 | 6/2003 | De Moel et al. | |
| 6,592,762 B2 | 7/2003 | Smith | |
| D478,913 S | 8/2003 | Johnson et al. | |
| 6,613,222 B2 | 9/2003 | Mikkelson et al. | |
| 6,620,319 B2 | 9/2003 | Behmann et al. | |
| 6,623,643 B2 | 9/2003 | Steward et al. | |
| 6,627,082 B2 | 9/2003 | Del Vecchio et al. | |
| 6,632,358 B1 | 10/2003 | Suga et al. | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,656,356 B2 | 12/2003 | Gungerich et al. | |
| 6,682,652 B2 | 1/2004 | Mahendran et al. | |
| 6,685,832 B2 | 2/2004 | Mahendran et al. | |
| 6,696,465 B2 | 2/2004 | Dellaria et al. | |
| 6,702,561 B2 | 3/2004 | Stillig et al. | |
| 6,706,185 B2 | 3/2004 | Goel et al. | |
| 6,706,189 B2 | 3/2004 | Rabie et al. | |
| 6,708,957 B2 | 3/2004 | Guibert et al. | |
| 6,712,970 B1 | 3/2004 | Trivedi | |
| 6,721,529 B2 | 4/2004 | Chen et al. | |
| 6,723,242 B1 | 4/2004 | Ohkata et al. | |
| 6,723,758 B2 | 4/2004 | Stone et al. | |
| 6,727,305 B1 | 4/2004 | Pavez Aranguiz | |
| 6,743,362 B1 | 6/2004 | Porteous et al. | |
| 6,755,970 B1 | 6/2004 | Knappe et al. | |
| 6,758,972 B2 | 7/2004 | Vriens et al. | |
| 6,761,826 B2 | 7/2004 | Bender | |
| 6,770,202 B1 | 8/2004 | Kidd et al. | |
| 6,780,466 B2 | 8/2004 | Grangeon et al. | |
| 6,783,008 B2 | 8/2004 | Zha et al. | |
| 6,790,347 B2 | 9/2004 | Jeong et al. | |
| 6,790,912 B2 | 9/2004 | Blong | |
| 6,805,806 B2 | 10/2004 | Arnaud | |
| 6,808,629 B2 | 10/2004 | Wouters-Wasiak et al. | |
| 6,811,696 B2 | 11/2004 | Wang et al. | |
| 6,814,861 B2 | 11/2004 | Husain et al. | |
| 6,821,420 B2 | 11/2004 | Zha et al. | |
| 6,830,782 B2 | 12/2004 | Kanazawa | |
| 6,841,070 B2 | 1/2005 | Zha et al. | |
| 6,861,466 B2 | 3/2005 | Dadalas et al. | |
| 6,863,816 B2 | 3/2005 | Austin et al. | |
| 6,863,817 B2 | 3/2005 | Liu et al. | |
| 6,863,818 B2 | 3/2005 | Daigger et al. | |
| 6,863,823 B2 | 3/2005 | Cote | |
| 6,869,534 B2 | 3/2005 | McDowell et al. | |
| 6,872,305 B2 | 3/2005 | Johnson et al. | |
| 6,881,343 B2 | 4/2005 | Rabie et al. | |
| 6,884,350 B2 | 4/2005 | Muller | |
| 6,884,375 B2 | 4/2005 | Wang et al. | |
| 6,890,435 B2 | 5/2005 | Ji et al. | |
| 6,890,645 B2 | 5/2005 | Disse et al. | |
| 6,893,568 B1 | 5/2005 | Janson et al. | |
| 6,899,812 B2 | 5/2005 | Cote et al. | |
| 6,936,085 B2 | 8/2005 | DeMarco | |
| 6,946,073 B2 | 9/2005 | Daigger et al. | |
| 6,952,258 B2 | 10/2005 | Ebert et al. | |
| 6,955,762 B2 | 10/2005 | Gallagher et al. | |
| 6,962,258 B2 | 11/2005 | Zha et al. | |
| 6,964,741 B2 | 11/2005 | Mahendran et al. | |
| 6,969,465 B2 | 11/2005 | Zha et al. | |
| 6,974,554 B2 | 12/2005 | Cox et al. | |
| 6,994,867 B1 | 2/2006 | Hossainy et al. | |
| 7,005,100 B2 | 2/2006 | Lowell | |
| 7,014,763 B2 | 3/2006 | Johnson et al. | |
| 7,018,530 B2 | 3/2006 | Pollock | |
| 7,018,533 B2 | 3/2006 | Johnson et al. | |
| 7,022,233 B2 | 4/2006 | Chen | |
| 7,041,728 B2 | 5/2006 | Zipplies et al. | |
| 7,052,610 B2 | 5/2006 | Janson et al. | |
| 7,083,733 B2 | 8/2006 | Freydina et al. | |
| 7,087,173 B2 | 8/2006 | Cote et al. | |
| 7,122,121 B1 | 10/2006 | Ji | |
| 7,147,777 B1 | 12/2006 | Porteous | |
| 7,147,778 B1 | 12/2006 | DiMassimo et al. | |
| 7,160,455 B2 | 1/2007 | Taniguchi et al. | |
| 7,160,463 B2 | 1/2007 | Beck et al. | |
| 7,160,464 B2 | 1/2007 | Lee et al. | |
| 7,172,699 B1 | 2/2007 | Trivedi et al. | |
| 7,172,701 B2 | 2/2007 | Gaid et al. | |
| 7,186,344 B2 | 3/2007 | Hughes | |
| 7,208,091 B2 | 4/2007 | Pind et al. | |
| 7,223,340 B2 | 5/2007 | Zha et al. | |
| 7,226,541 B2 | 6/2007 | Muller et al. | |
| 7,247,238 B2 | 7/2007 | Mullette et al. | |
| 7,264,716 B2 | 9/2007 | Johnson et al. | |
| 285,321 A1 | 10/2007 | Tams | |
| 7,279,100 B2 | 10/2007 | Devine | |
| 7,279,215 B2 * | 10/2007 | Hester et al. | 428/178 |

| Patent No. | Date | Name |
|---|---|---|
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1* | 12/2003 | Johnson et al. ............... 210/650 |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0091602 A1 | 4/2012 | Cumin et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898Y Y | 8/1995 |
| CN | 2236049Y Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 * | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60-206412 | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05023557 A | 2/1993 |
| JP | 05096136 A | 4/1993 |

| | | | | | | |
|---|---|---|---|---|---|---|
| JP | 05137977 | A | 6/1993 | JP | 11028467 A | 2/1999 |
| JP | 05157654 | A | 6/1993 | JP | 11031025 A | 2/1999 |
| JP | 05161831 | A | 6/1993 | JP | 11033365 A | 2/1999 |
| JP | 05184884 | A | 7/1993 | JP | 11033367 A | 2/1999 |
| JP | 05279447 | A | 10/1993 | JP | 11076769 A | 3/1999 |
| JP | 05285348 | A | 11/1993 | JP | 11076770 A | 3/1999 |
| JP | 05305221 | A | 11/1993 | JP | 11156166 A | 6/1999 |
| JP | 06-027215 | A | 2/1994 | JP | 11156360 A | 6/1999 |
| JP | 06071120 | A | 3/1994 | JP | 11165200 A | 6/1999 |
| JP | 06114240 | A | 4/1994 | JP | 11-179171 A | 7/1999 |
| JP | 06170364 | A | 6/1994 | JP | 11-309351 A | 11/1999 |
| JP | 06190250 | A | 7/1994 | JP | 11300177 A | 11/1999 |
| JP | 06218237 | A | 8/1994 | JP | 11302438 A | 11/1999 |
| JP | 06238273 | A | 8/1994 | JP | 11319501 A | 11/1999 |
| JP | 06-292820 | A | 10/1994 | JP | 11319507 A | 11/1999 |
| JP | 06277469 | A | 10/1994 | JP | 11333265 A | 12/1999 |
| JP | 06285496 | A | 10/1994 | JP | 2000000439 A | 1/2000 |
| JP | 06343837 | A | 12/1994 | JP | 200051670 | 2/2000 |
| JP | 07000770 | A | 1/1995 | JP | 2000051669 A | 2/2000 |
| JP | 07024272 | A | 1/1995 | JP | 2000061466 A | 2/2000 |
| JP | 07047247 | A | 2/1995 | JP | 200079390 A | 3/2000 |
| JP | 07068139 | A | 3/1995 | JP | 2000070684 A | 3/2000 |
| JP | 07136470 | A | 5/1995 | JP | 2000-093758 | 4/2000 |
| JP | 07136471 | A | 5/1995 | JP | 2000-157845 | 6/2000 |
| JP | 07155564 | A | 6/1995 | JP | 2000157850 A | 6/2000 |
| JP | 07155758 | A | 6/1995 | JP | 2000185220 A | 7/2000 |
| JP | 7-39921 | | 7/1995 | JP | 2000189958 A | 7/2000 |
| JP | 07178323 | A | 7/1995 | JP | 2000233020 A | 8/2000 |
| JP | 07185268 | A | 7/1995 | JP | 2000237548 A | 9/2000 |
| JP | 07185270 | A | 7/1995 | JP | 2000300968 A | 10/2000 |
| JP | 07185271 | A | 7/1995 | JP | 2000317276 A | 11/2000 |
| JP | 07185272 | A | 7/1995 | JP | 2000-334276 | 12/2000 |
| JP | 07204635 | A | 8/1995 | JP | 2000342932 A | 12/2000 |
| JP | 07236819 | A | 9/1995 | JP | 2001009246 A | 1/2001 |
| JP | 07-256253 | | 10/1995 | JP | 2001070967 A | 3/2001 |
| JP | 07251043 | A | 10/1995 | JP | 2001079366 A | 3/2001 |
| JP | 07275665 | A | 10/1995 | JP | 2001079367 A | 3/2001 |
| JP | 07289860 | A | 11/1995 | JP | 2001104760 A | 4/2001 |
| JP | 07303895 | A | 11/1995 | JP | 2001120963 A | 5/2001 |
| JP | 07313973 | A | 12/1995 | JP | 2001-510396 T | 7/2001 |
| JP | 08010585 | A | 1/1996 | JP | 2001179059 A | 7/2001 |
| JP | 8039089 | A | 2/1996 | JP | 2001179060 A | 7/2001 |
| JP | 08-197053 | A | 8/1996 | JP | 2001190937 A | 7/2001 |
| JP | 08323161 | A | 12/1996 | JP | 2001190938 A | 7/2001 |
| JP | 08332357 | A | 12/1996 | JP | 2001205055 A | 7/2001 |
| JP | 09000890 | A | 1/1997 | JP | 2001-269546 | 10/2001 |
| JP | 09038470 | A | 2/1997 | JP | 2002177746 A | 6/2002 |
| JP | 09-075689 | A | 3/1997 | JP | 3302992 B2 | 7/2002 |
| JP | 09072993 | A | 3/1997 | JP | 2002-527229 | 8/2002 |
| JP | 09099227 | A | 4/1997 | JP | 2002525197 T | 8/2002 |
| JP | 09103655 | A | 4/1997 | JP | 2002263407 A | 9/2002 |
| JP | 9103661 | A | 4/1997 | JP | 2002-336663 A | 11/2002 |
| JP | 9117647 | A | 5/1997 | JP | 2003024751 | 1/2003 |
| JP | 9138298 | A | 5/1997 | JP | 2003047830 A | 2/2003 |
| JP | 09141063 | A | 6/1997 | JP | 2003053157 A | 2/2003 |
| JP | 09155345 | A | 6/1997 | JP | 2003053160 A | 2/2003 |
| JP | 09187628 | A | 7/1997 | JP | 200371254 A | 3/2003 |
| JP | 09192458 | A | 7/1997 | JP | 2003062436 A | 3/2003 |
| JP | 09220569 | A | 8/1997 | JP | 2003135935 A | 5/2003 |
| JP | 09271641 | A | 10/1997 | JP | 2003190976 A | 7/2003 |
| JP | 09-313902 | A | 12/1997 | JP | 2003-265597 | 9/2003 |
| JP | 09324067 | A | 12/1997 | JP | 2003-275548 | 9/2003 |
| JP | 10-015365 | A | 1/1998 | JP | 2003266072 A | 9/2003 |
| JP | 10024222 | A | 1/1998 | JP | 2003275759 A | 9/2003 |
| JP | 10033955 | A | 2/1998 | JP | 2003340250 A | 12/2003 |
| JP | 10048466 | A | 2/1998 | JP | 2004-008981 | 1/2004 |
| JP | 10076144 | A | 3/1998 | JP | 2004073950 | 3/2004 |
| JP | 10076264 | A | 3/1998 | JP | 2004-230287 A | 8/2004 |
| JP | 10085562 | A | 4/1998 | JP | 2004216263 A | 8/2004 |
| JP | 10085565 | A | 4/1998 | JP | 2004230280 A | 8/2004 |
| JP | 10085566 | A | 4/1998 | JP | 2004322100 A | 11/2004 |
| JP | 10156149 | A | 6/1998 | JP | 2004-536710 A | 12/2004 |
| JP | 10180048 | A | 7/1998 | JP | 2004337730 A | 12/2004 |
| JP | 10225685 | A | 8/1998 | JP | 2005-502467 A | 1/2005 |
| JP | 10235168 | A | 9/1998 | JP | 2005-087887 A | 4/2005 |
| JP | 10249171 | A | 9/1998 | JP | 2005144291 A | 6/2005 |
| JP | 10286441 | A | 10/1998 | JP | 2005154551 A | 6/2005 |
| JP | 10328538 | A | 12/1998 | JP | 2005279447 A | 10/2005 |
| JP | 11005023 | A | 1/1999 | JP | 2006-116495 | 5/2006 |

| | | |
|---|---|---|
| JP | 2007-547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1006390 C2 | 12/1998 |
| NL | 1020491 C | 10/2003 |
| NL | 1021197 C | 10/2003 |
| NZ | 510394 A | 5/2003 |
| NZ | 537874 A | 2/2007 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 8801895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 99-55448 A1 | 11/1999 |
| WO | 9959707 A1 | 11/1999 |
| WO | 0018498 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0226363 A2 | 4/2002 |
| WO | 0230550 A1 | 4/2002 |
| WO | 0240140 A1 | 5/2002 |
| WO | 02047800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

Almulla et al., Desalination, 153 (2002), pp. 237-243.
Anonymous, "Nonwoven Constructions of Dyneon "THV and Dyneon"THE Fluorothermoplastics", Research Disclosure Journal, Apr. 1999, RD 420013, 2 pages.
Cote et al., Wat. Sci. Tech. 38(4-5) (1998), pp. 437-442.
Cote, et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent, N. et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999 Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic" Kirk-Othmer Encyclopedia of Chemical Technology, Peroxides and Peroxy Compounds, Inorganic, To Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmmrw.interscience.wiley.com/eow/.

Webster's Ninth New Collegiate Dictionary, Merriam-Webster Inc., Publishers, Springfield, Massachusetts, USA, Copyright 1986, p. 1298.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Zenon, "Proposal for ZeeWeed® Membrane Filtration Equipment System for the City of Westminster, Colorado, Proposal No. 479-99," Mar. 2000, entire publication.

Cui et al., "Airlift crossflow membrane filtration—a feasibility study with dextran ultrafiltration," J. Membrane Sci. (1997) vol. 128, pp. 83-91.

Coulson et al., "Coulson and Richardson's Chemical Engineering," 1999, vol. 1, pp. 358-364.

International Preliminary Report on Patentability dated Sep. 17, 2010 for Application No. PCT/AU2009/000965.

International Search Report dated Oct. 1, 2009 for Application No. PCT/AU2009/000965.

Singapore Examination Report dated Nov. 11, 2011 for Application No. 201009669-1.

Supplementary European Search Report dated Aug. 16, 2012 for Application No. 09799876.9.

Written Opinion of the International Searching Authority dated Sep. 28, 2009 for Application No. PCT/AU2009/000965.

\* cited by examiner

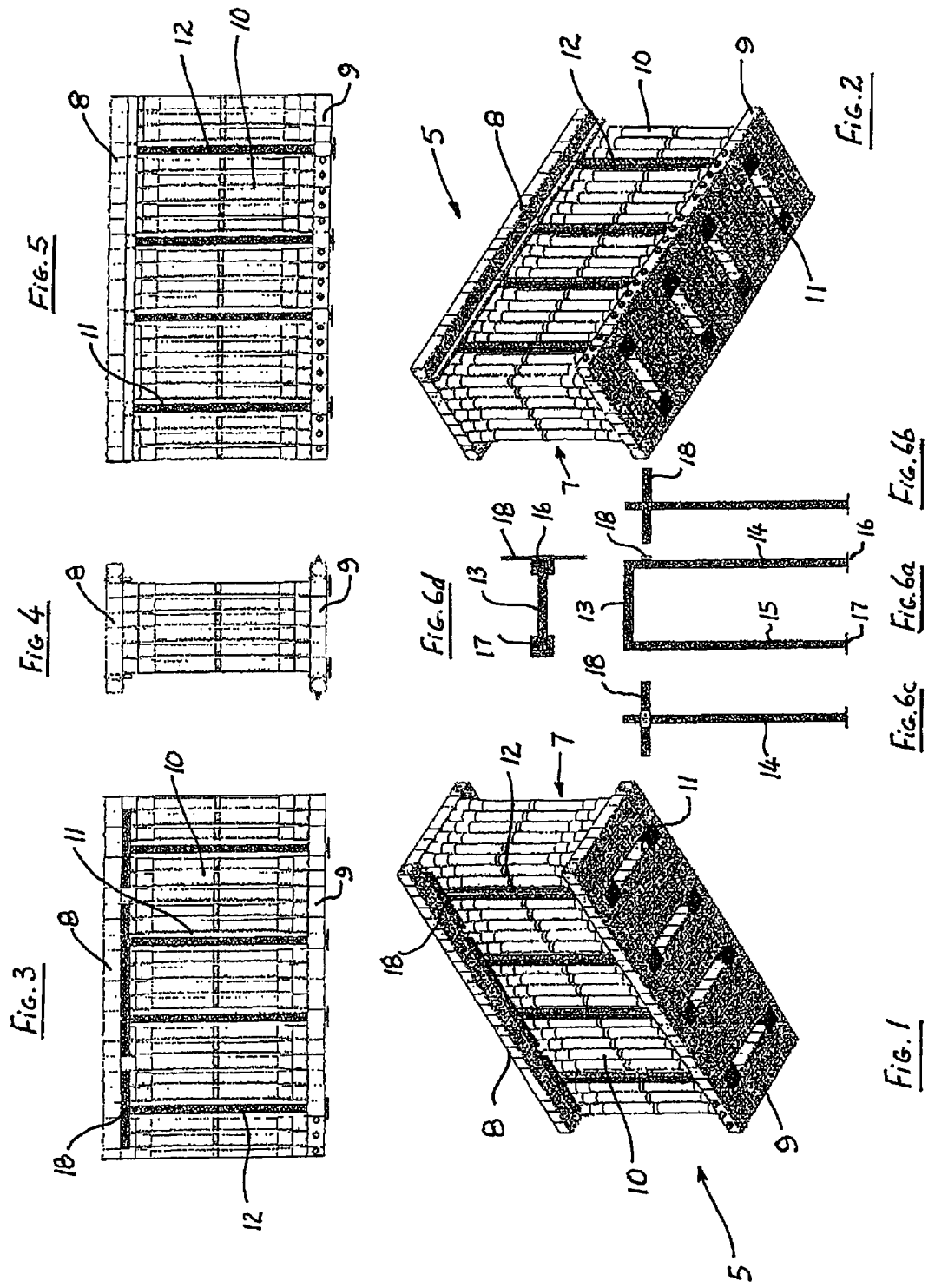

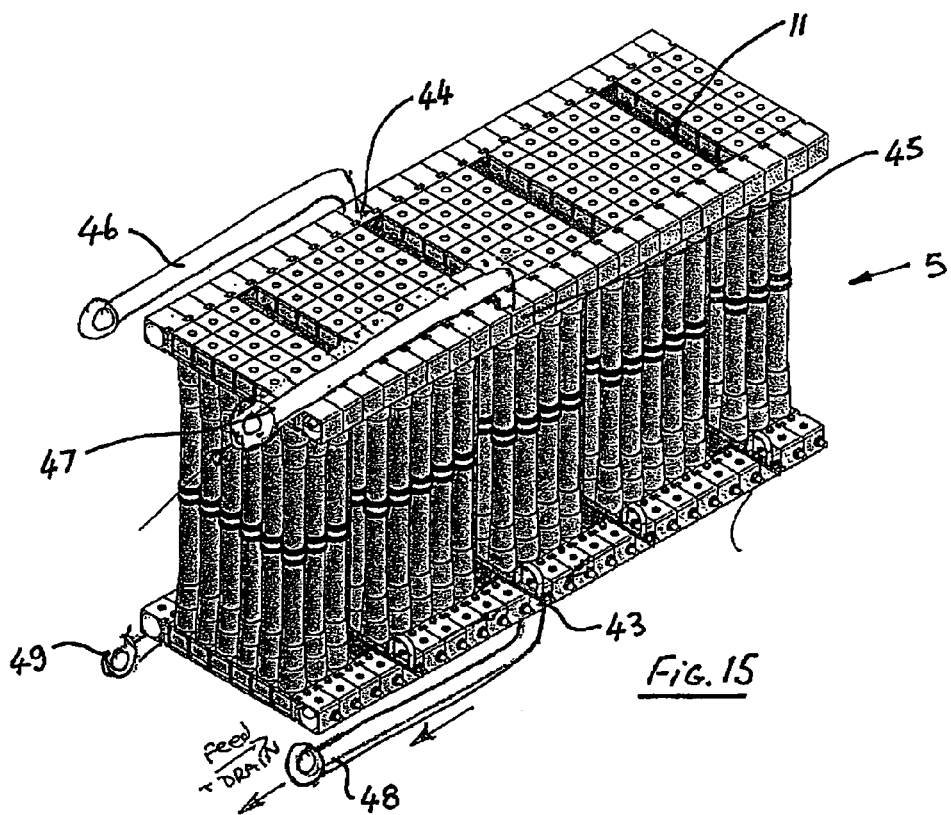
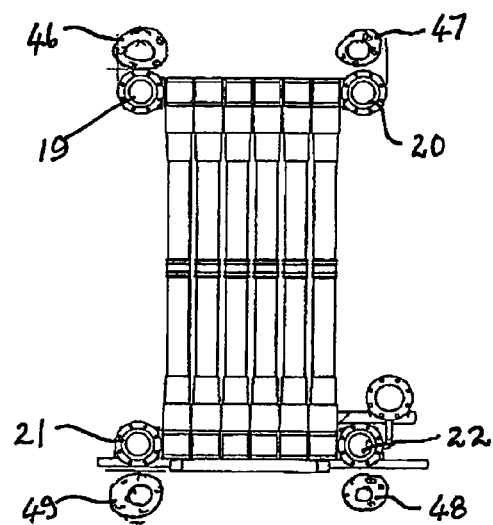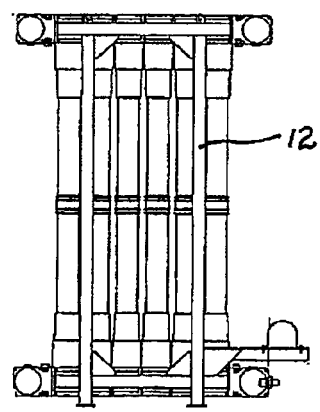
Fig. 15
Fig. 16
Fig. 17

FRAME SYSTEM FOR MEMBRANE FILTRATION MODULES

TECHNICAL FIELD

The present invention relates to membrane filtration systems employing banks of membrane modules and, more particularly, to support or mounting frames and methods for such modules.

BACKGROUND OF THE INVENTION

Modular filtration systems employing arrays of membrane modules connected by common fluid flow manifolds are used to allow systems of varying capacity to be constructed according to the needs of a particular customer. These systems are typically constructed by building the module array and then an independent external frame or "exoskeleton" is built around the module array either in the factory or onsite to support the modules and provide a robust structure. Typically, the frames and module arrays are manufactured and transported separately due to size constraints and the assembled on site. This involves a lot of expensive "double handling" the various components of the eventual operating system.

Such support structures require costly design and manufacture as well as different designs each time the size of the module array is varied. There is a need for a simpler support system which can easily accommodate varying system size requirements while reducing structure size and cost. A compact structure enables shipping of the complete system as a single unit from the manufacturing factory to the user's site.

DISCLOSURE OF THE INVENTION

The present invention seeks to overcome or at least ameliorate one or more of the above disadvantages of the prior art or provide a useful alternative.

According to one aspect, the present invention provides a filtration system comprising a plurality of membrane modules arranged in an array and the membrane module array being divided into membrane module array sub-groups by a spacing between numbers of modules within the membrane module array and an integrated support member located within said spacing to support said membrane module array.

According to another aspect of the invention there is provided a method for providing structural support to an array of membrane filtration modules in a filtration system comprising the steps of:

forming a number of sub-groups of modules within the array of filtration modules by providing a spacing between a number of modules forming a sub-group;

locating a structural support member within the spacing between adjacent sub-groups.

Preferably, the membrane modules extend between first and second fluid communicating manifolds and the support member is connected to at least one of said manifolds to support said membrane module array. For preference, the manifolds comprise upper and lower manifolds and the membrane modules extend generally vertically therebetween. Preferably, a number of support members may be connected together to form a support structure.

The membrane modules may comprise bundles of hollow fibre membranes extending between spaced headers. The filtration system may be a pressurised or non-pressurised submersed membrane filtration system.

BRIEF DESCRIPTION OF THE DRAWINGS

Preferred embodiments of the invention will now be described, by way of example only, with reference to the accompanying drawings in which:

FIG. 1 shows a left side isometric view of a module arrangement according to a first embodiment of the invention;

FIG. 2 shows a right side isometric view of a module arrangement according to embodiment of FIG. 1;

FIG. 3 shows a left side elevation view of a module arrangement according to embodiment of FIG. 1;

FIG. 4 shows an end elevation view of a module arrangement according to embodiment of FIG. 1;

FIG. 5 shows a right side elevation view of a module arrangement according to embodiment of FIG. 1;

FIG. 6a shows an elevation view of the frame employed in the embodiment of FIG. 1;

FIG. 6b shows a left side elevation view of the frame employed in the embodiment of FIG. 1;

FIG. 6c shows a right side elevation view of the frame employed in the embodiment of FIG. 1;

FIG. 6d shows a plan view of the frame employed in the embodiment of FIG. 1;

FIG. 15 shows an isometric view of a module arrangement according to a sixth embodiment of the invention;

FIG. 16 shows a left side end elevation view of the module arrangement of the embodiment of FIG. 15;

FIG. 17 shows a right side end elevation view of the module arrangement of the embodiment of FIG. 15;

DESCRIPTION OF PREFERRED EMBODIMENTS

Figure 7:
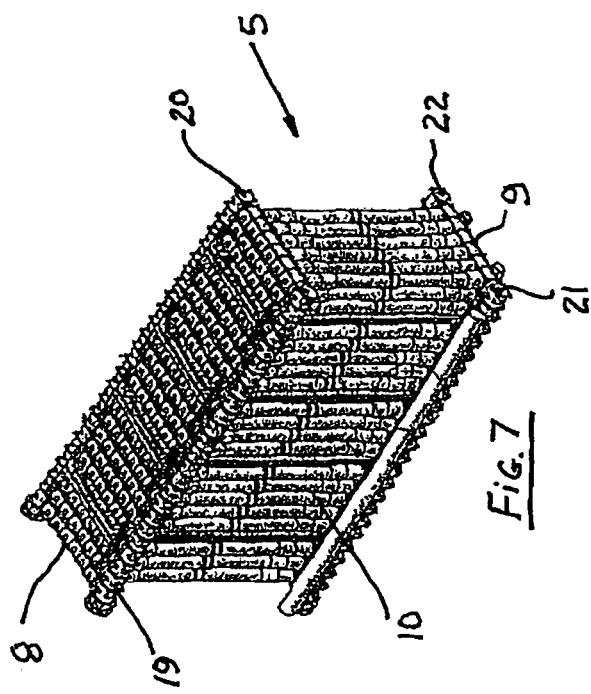
FIG. 7 shows a left side isometric view of a module arrangement according to a second embodiment of the invention.

Referring to FIGS. 1 to 7, a module arrangement according to a first embodiment of the invention is shown.

The module arrangement 5 consists of a plurality of membrane modules 6 arranged in a two dimensional array 7 and extending between upper and lower block-type manifolds 8 and 9, respectively. The array of modules is further divided into sub-groups of modules 10 separated from each other by space 11 extending transversely across the membrane array 7. An integrated support frame 12 is positioned in the space 11 between the sub-groups 10 and is fixed to the upper and lower manifold blocks 8 and 9 to form an integrated support structure within the module array 7.

The support frame 12 is shown in more detail in FIGS. 6a to 6d. The support frame 12, according to this embodiment, is generally inverted U-shape in configuration having an upper cross portion 13 and a pair of downwardly extending arms 14 and 15 respectively. Associated flanges 16 and 17 are provided at the end of each arm 14 and 15 for connection to the lower manifold block 9. A laterally extending cross member 18 is provided adjacent the upper cross portion 13 for connection to the upper manifold block 8 and hangs therefrom.

Referring to FIGS. 8 to 11, a module arrangement according to a second embodiment of the invention is shown. This embodiment is generally similar to the first embodiment described above with some minor changes.

In this embodiment, the upper and lower manifold blocks 8 and 9 are provided with further upper manifold pipes 19 and 20 extending along opposite sides of the upper manifold blocks 8 and further lower manifold pipes 21 and 22 extending along opposite sides of the lower manifold blocks 9.

Figure 11:
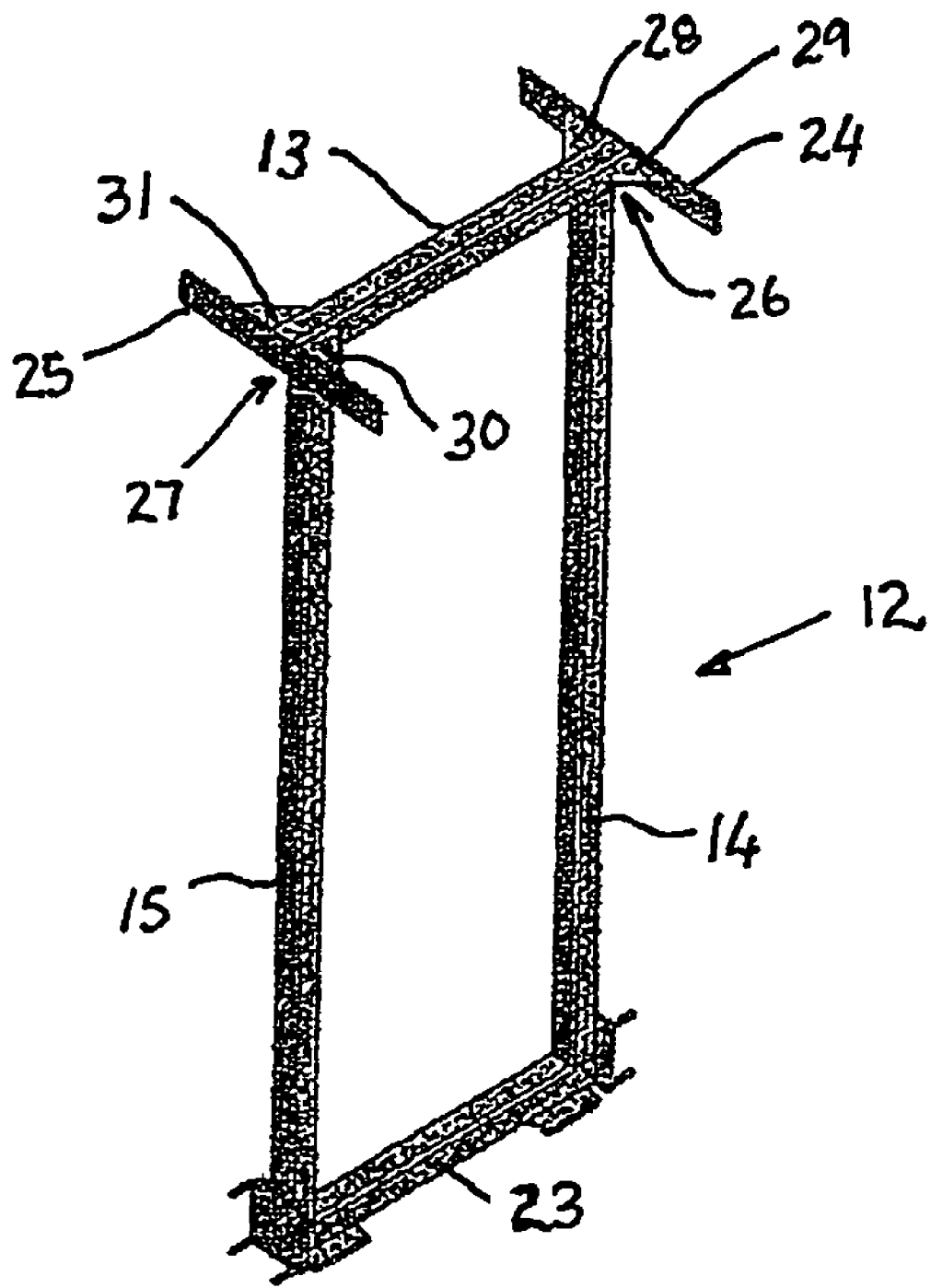
FIG. 11 shows an isometric view of the frame employed in the module arrangement according to the embodiment of FIG. 7.

The frame used in this embodiment is best shown in FIG. 11. The support frame 12, according to this embodiment, is generally rectangular-shaped in configuration having a base portion 23 and a pair of upwardly extending arms 14 and 15 respectively, extending to an upper cross portion 13. The upper cross portion 13 has a pair of cross members 24 and 25 provided at each end 26 and 27 and extending at right angles with respect to the rectangular body of the support frame 12. Respective strengthening gussets 28, 29, 30 and 31 are provided between the cross portion 13 and the cross members 24 and 25.

Figure 9:
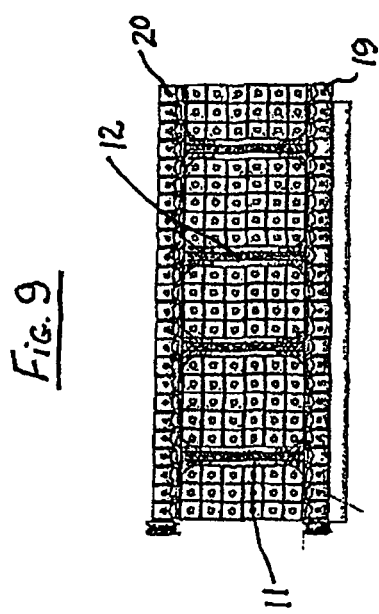
FIG. 9 shows a plan view of a module arrangement according to embodiment of FIG. 7.
Figure 8:
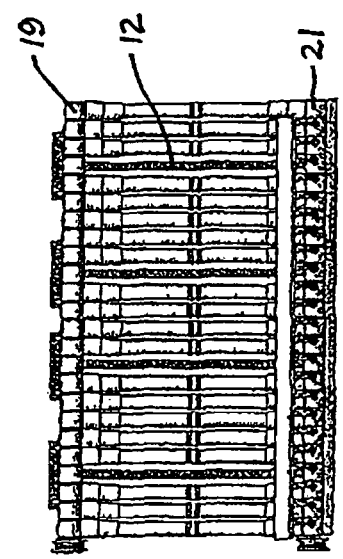
FIG. 8 shows a left side elevation view of a module arrangement according to embodiment of FIG. 7.
Figure 10:
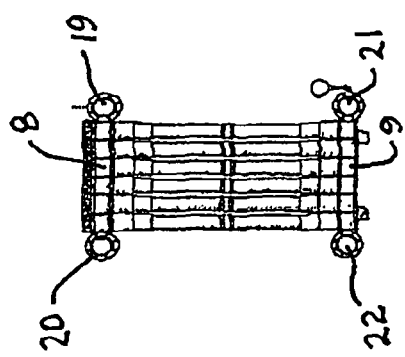
FIG. 10 shows an end elevation view of a module arrangement according to embodiment of FIG. 7.

As best shown in FIG. 9, the support frame 12 sits within the space 11 between the sub-groups 10 and hangs from the upper manifold blocks by means to of the cross members 24 and 25 which extend longitudinally along the upper manifold blocks 8 generally parallel to the upper manifold pipes 19 and 20.

Figure 12:
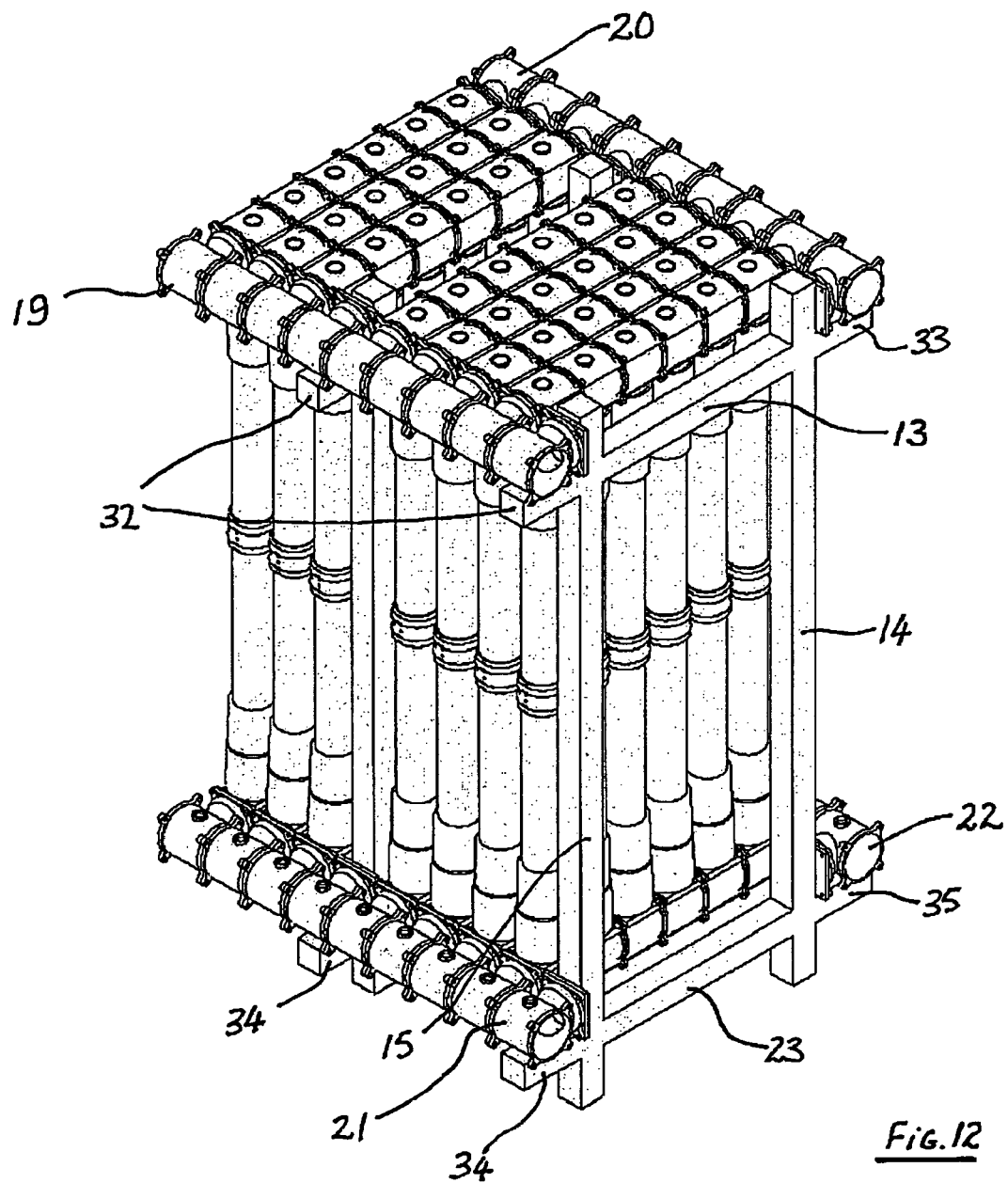
FIG. 12 shows an isometric view of a module arrangement according to a third embodiment of the invention.
Figure 13:
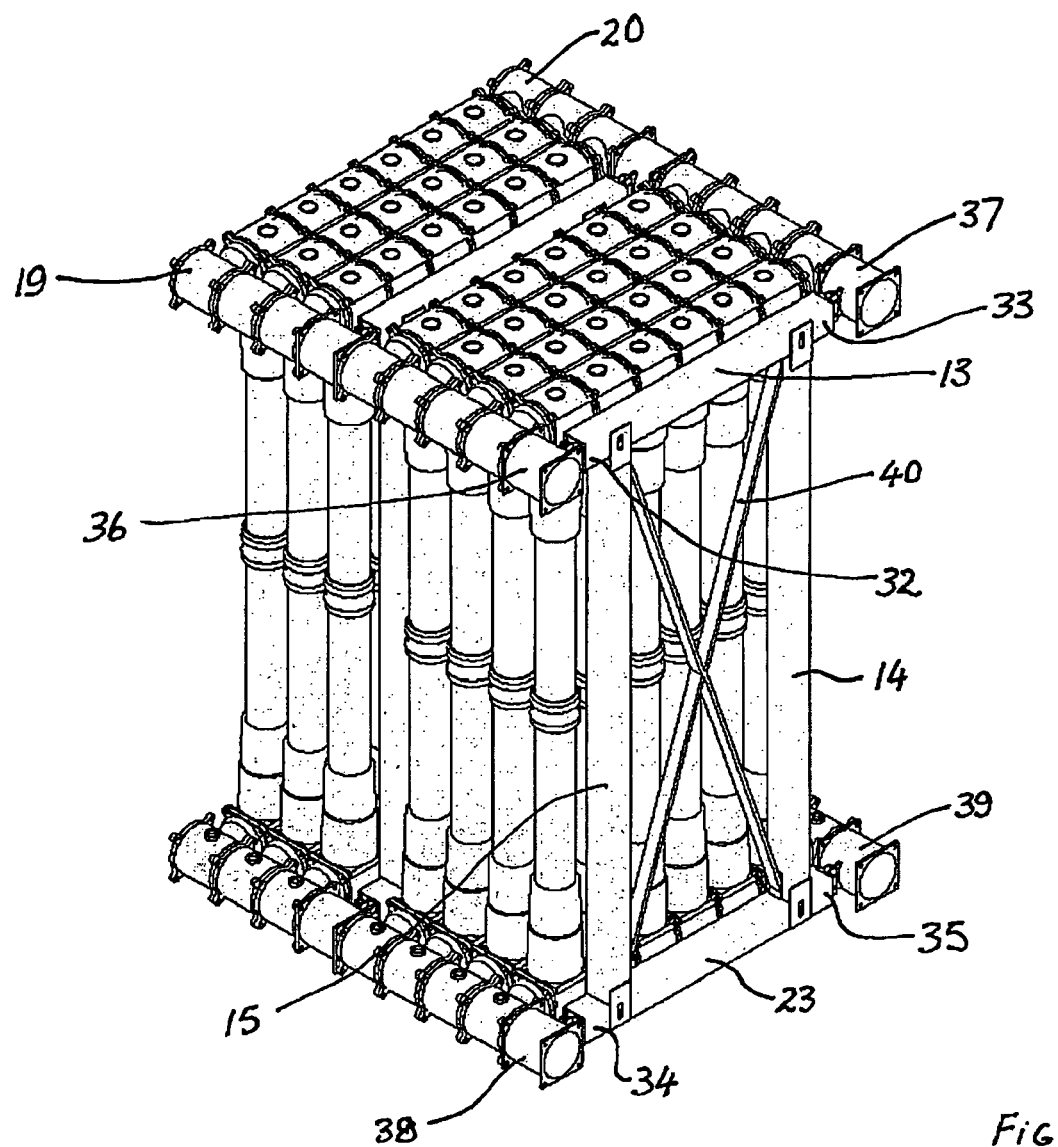
FIG. 13 shows an isometric view of a module arrangement according to a fourth embodiment of the invention.

FIGS. 12 to 13 show three different embodiments of the invention employing different support structures for the support frame.

Referring to the embodiment shown in FIG. 12, the frame 12 in this is embodiment is generally "hatch" shaped in configuration with each portion of the frame 12 extending beyond the portion to which it joins. As shown, the extended portions 32 and 33 of the upper cross portion 13 support the upper manifold pipes 19 and 20. The extended portions 34 and 35 of the base portion 23 sit above the lower manifold pipes 21 and 22 and may be attached thereto by suitable fittings.

Referring to the embodiment shown in FIG. 13, the frame 12 in this embodiment is generally rectangular-shaped in configuration with only the base portion 23 and the upper cross portion 13 of the frame 12 extending beyond the portion to which it joins. As shown, the extended portions 32 and 33 of the upper cross portion 13 are connected to a respective spool piece 36 and 37 located in the upper manifold pipes 19 and 20 adjacent the space 11. The extended portions 34 and 35 of the base portion 23 are also connected to a respective spool piece 38 and 39 located in the lower manifold pipes 21 and 22 adjacent the space 11.

Figure 14:
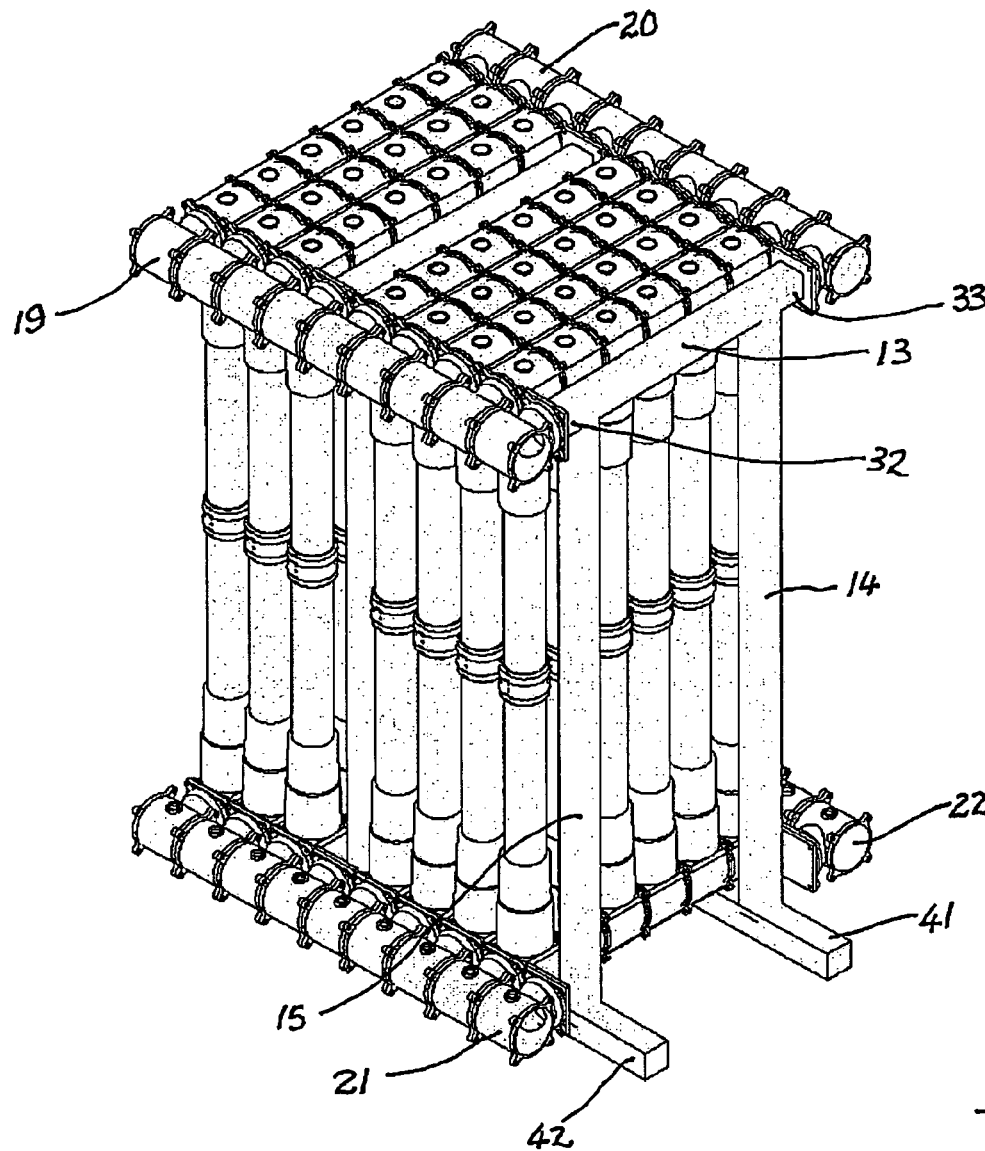
FIG. 14 shows an isometric view of a module arrangement according to a fifth embodiment of the invention.

Referring to the embodiment shown in FIG. 14, the frame 12 in this embodiment is generally rectangular-shaped in configuration with an open base portion and the upper cross portion 13 of the frame 12 extending beyond the portion to which it joins. As shown, the extended portions 32 and 33 of the upper cross portion 13 are connected to the upper manifold pipes 19 and 20 adjacent the space 11. The lower portion of the frame is provided with longitudinally extending rails 41 and 42 which extend parallel to and inwards of the lower manifold pipes 21 and 22. The rails 41 and 42 may join with other frames along the length of the module array 5 to form a skid on which the module array 5 is supported.

FIGS. 15 to 17 show a further embodiment of the invention where the unused block manifolds located at end of the space 11 between the module sub-groups are employed to provide further fluid flow capacity to the module array 5. As best shown in FIG. 15, the unused manifold blocks 43, 44 and 45 may be rotated through 90 degrees or provided with a T-piece to allow connection of further piping 46, 47, 48 and 49, which extends parallel with the moulded block manifolds and provides for additional fluid flow paths from the upper and lower manifolds of the module array 5. These additional fluid flow paths may be used to provide additional feed, filtrate and waste drain flows to the module array through piping 46, 47 and 48/49, respectively.

Figure 18:
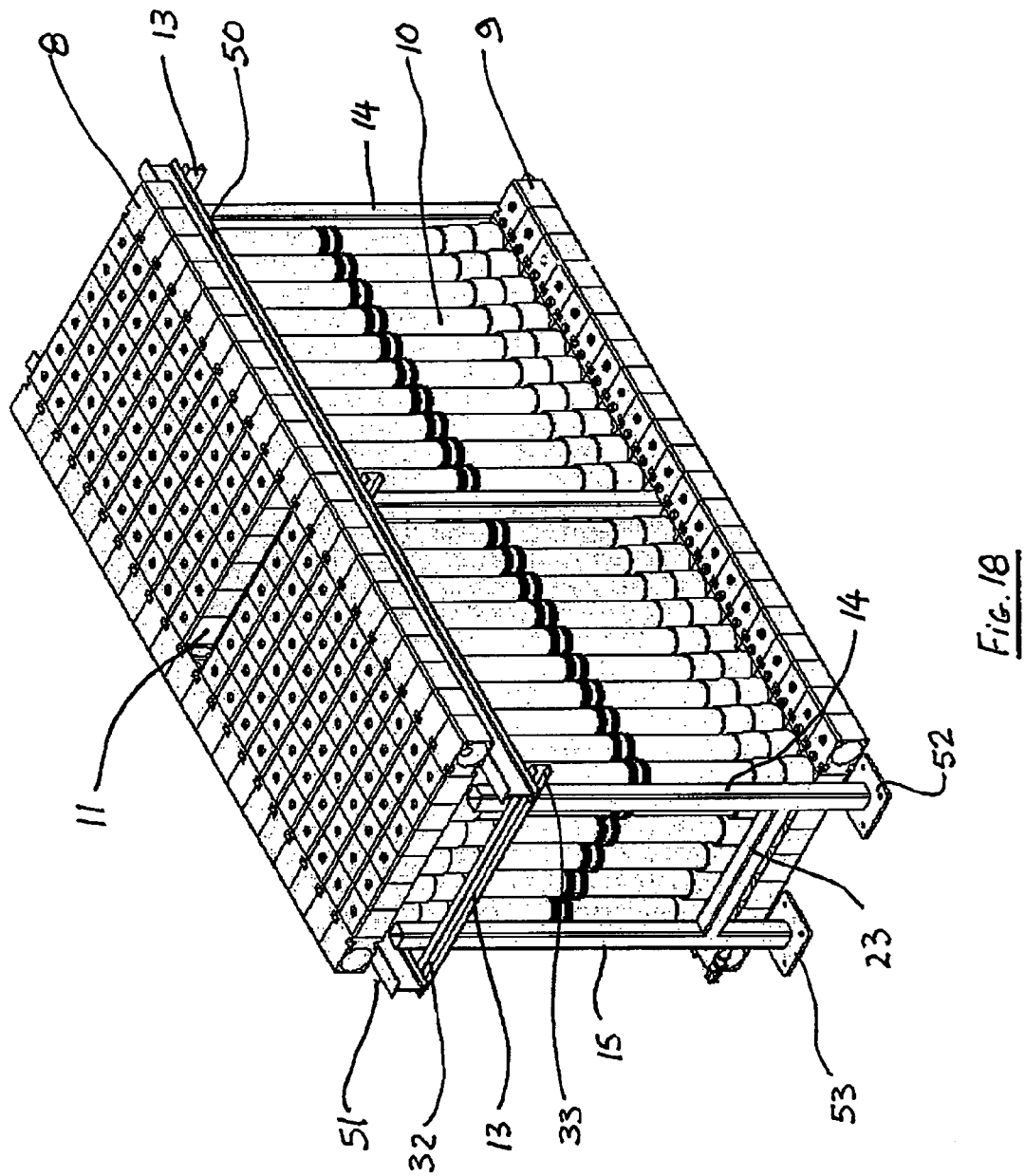
FIG. 18 shows an isometric view of a module arrangement according to a seventh embodiment of the invention.
Figure 19:
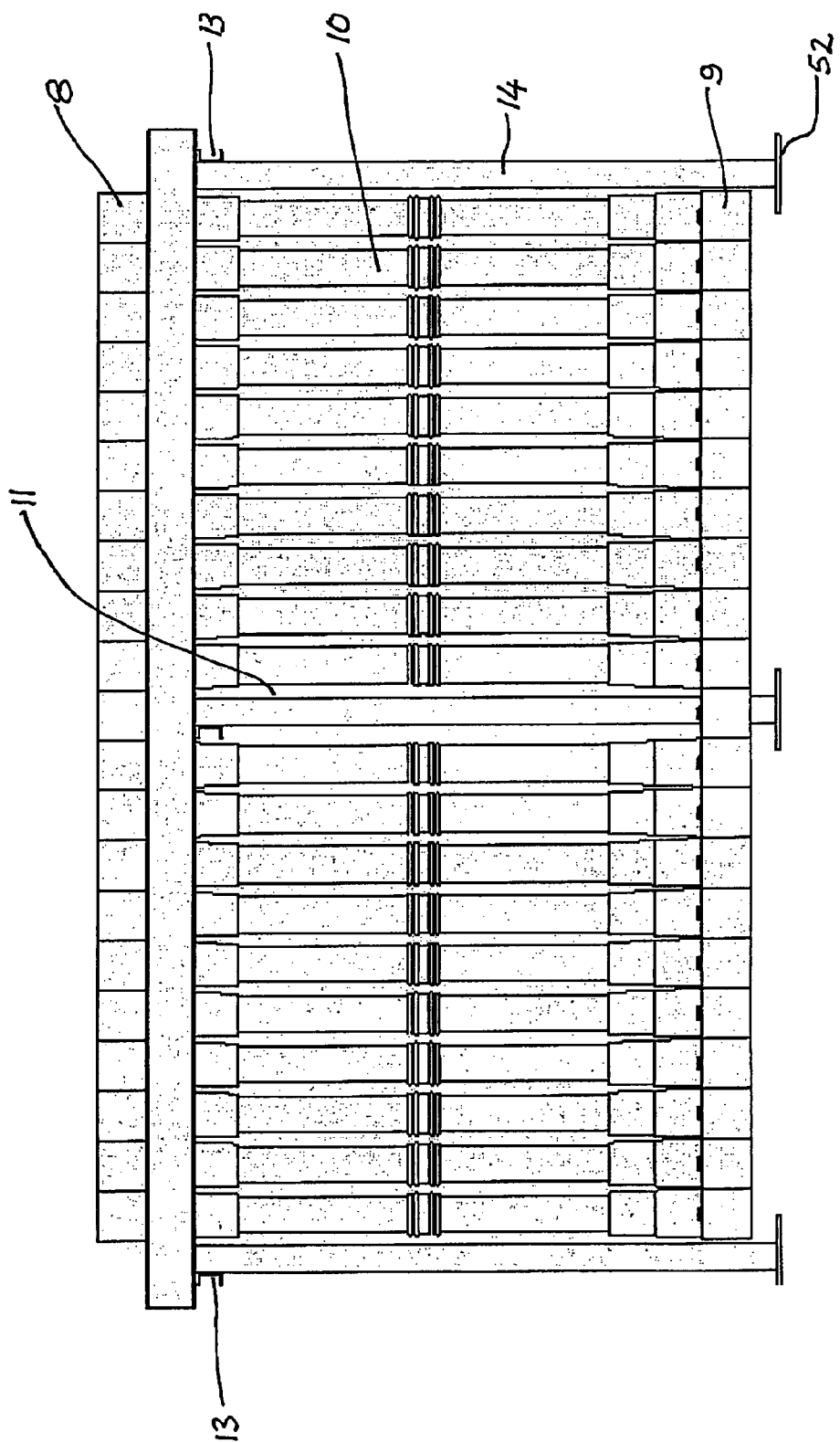
FIG. 19 shows a right side elevation view of a module arrangement according to embodiment of FIG. 18.

FIGS. 18 and 19 show a further a further embodiment of the invention where the support frames 12 are joined to longitudinally extending support rails 50 and 51. Again the support frame 12 is generally "hatch" shaped in configuration with each upper portion of the frame 12 extending beyond the portion to which it joins. As shown, the extended portions 32 and 33 of the upper cross portion 13 support the respective longitudinally support rails 51 and 52. The base of each of the vertical arms 14 and 15 of each support frame 12 are provided with support feet or flanges 52 and 53 for fixing the module arrangement to a support base when installed. The support rails 51 and 52 sit to beneath the outer upper manifold blocks 8 to support the membrane module array 7. The support frames 12 are positioned at each end of the array 7 and within the space 11 between module sub-groups 10. The support rails 51 and 52 are in the form of I-shaped beams and the upper cross members 13 are C-shaped in cross-section to provide maximum strength at low weight.

It will be appreciated the use of a support system, as described above, enables the filtration system to be constructed as single unit which can be readily transported to user sites. The system can also be readily adapted to different size and capacity requirements as desired by a customer without the requirement for redesign of the support system. The use of the integrated support system enables, in some embodiments, for the overall footprint of the system to be reduced leading to reduced transport and site costs. The number of support members can be readily changed to allow for varying degrees of structural integrity, as required, for example in regions of high seismic activity.

It will be appreciated that further embodiments and exemplifications of the invention are possible without departing from the spirit or scope of the invention described.

The invention claimed is:

1. A filtration system comprising:
    a plurality of membrane modules arranged in a membrane module array divided into membrane module array sub-groups by a spacing between numbers of modules within the membrane module array, the membrane modules extending between a first fluid communicating manifold and a second fluid communicating manifold; and
    an integrated support member located within the spacing and including one of a first portion of the support member disposed in an aperture in the first fluid communicating manifold and a second portion of the support member disposed in an aperture in the second fluid communicating manifold, the integrated support member including:
        an upper cross portion;
        a base portion; and
        a pair of vertically extending arms affixed between the upper cross portion and the base portion;

each of the upper cross portion, the base portion, and the pair of vertically extending arms including extended portions extending outside of a perimeter of a rectangle defined by the upper cross portion, the base portion, and the pair of vertically extending arms.

2. The system of claim 1, wherein the support member is connected to at least one of the first fluid communicating manifold and the second fluid communicating manifold.

3. The system of claim 2, wherein the first fluid communicating manifold and the second fluid communicating manifold comprise upper and lower manifolds and the membrane modules extend generally vertically therebetween.

4. The system of claim 2, wherein a number of the support members are connected together to form a support structure.

5. The system of claim 1, wherein the plurality of membrane modules comprise bundles of hollow fibre membranes.

6. The system of claim 1, wherein the system is a pressurised membrane filtration system.

7. The system of claim 1, wherein the system is a non-pressurised submersed membrane filtration system.

8. The system of claim 1, wherein the integrated support member includes a first portion disposed in the aperture in the first fluid communicating manifold and a second portion disposed in the aperture in the second fluid communicating manifold.

9. The system of claim 1, wherein the extended potions of the upper cross portion support longitudinal support rails coupled to the first fluid communicating manifold.

10. The system of claim 1, wherein a base of each of the vertically extending arms include support flanges configured to fix the membrane module array to a support base.

11. The system of claim 1, wherein the extended portion of the upper cross portion is affixed to a manifold pipe coupled to the first fluid communicating manifold, and the extended portion of the base portion is affixed to a manifold pipe coupled to the second fluid communicating manifold.

12. The system of claim 1, further comprising a fluid conduit directly affixed to a manifold block located at an end of the spacing between the numbers of modules.

* * * * *